(12) United States Patent
Tsukimori et al.

(10) Patent No.: US 8,580,892 B2
(45) Date of Patent: Nov. 12, 2013

(54) RUBBER COMPOSITION AND USES THEREOF

(75) Inventors: Kazuyuki Tsukimori, Okayama (JP); Junryo Nariai, Shimane (JP); Tsutomu Inuyama, Shimane (JP); Shinji Mizuno, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/512,629

(22) PCT Filed: Nov. 16, 2010

(86) PCT No.: PCT/JP2010/070401
§ 371 (c)(1),
(2), (4) Date: Aug. 3, 2012

(87) PCT Pub. No.: WO2011/070896
PCT Pub. Date: Jun. 16, 2011

(65) Prior Publication Data
US 2012/0309881 A1 Dec. 6, 2012

(30) Foreign Application Priority Data

Dec. 11, 2009 (JP) ................................. 2009-282234

(51) Int. Cl.
*C08L 15/00* (2006.01)
*C08L 9/02* (2006.01)
*C08L 27/12* (2006.01)
*C08K 5/14* (2006.01)
*C09K 3/10* (2006.01)

(52) U.S. Cl.
USPC ........... 525/191; 525/199; 525/200; 525/238; 525/240

(58) Field of Classification Search
USPC .......................... 525/191, 199, 200, 238, 240
See application file for complete search history.

(56) References Cited

U.S. PATENT DOCUMENTS

| 7,608,216 B2 * | 10/2009 | Park et al. ..................... 264/459 |
| 2002/0154838 A1 | 10/2002 | Yabe et al. |
| 2003/0065067 A1 | 4/2003 | Miwa et al. |
| 2003/0119993 A1 | 6/2003 | Apostolo et al. |
| 2007/0191554 A1 | 8/2007 | Yamaguchi et al. |

FOREIGN PATENT DOCUMENTS

| EP | 0 604 655 A1 | 7/1994 |
| JP | 4 126727 A | 4/1992 |
| JP | 4 268357 A | 9/1992 |
| JP | 5 296233 A | 11/1993 |
| JP | 9 67473 A | 3/1997 |
| JP | 2000 281856 A | 10/2000 |
| JP | 2000 318042 A | 11/2000 |
| JP | 2002 310171 A | 10/2002 |
| JP | 2003 137930 A | 5/2003 |
| JP | 2005 135780 A | 5/2005 |
| JP | 2007 238928 A | 9/2007 |
| WO | 93 20148 A1 | 10/1993 |

OTHER PUBLICATIONS

International Search Report w/translation for PCT/JP2010/070401 dated Jan. 11, 2011 (4 pages).
Written Opinion for PCT/JP2010/070401 dated Jan. 11, 2011 (5 pages).
Patent Abstracts of Japan for publication No. 04-268357 dated Sep. 24, 1992 (1 page).
Japanese Office Action (Notification of Reasons for Refusal) w/ translation for Application No. 2009-282234, dated Jan. 11, 2011(10 pages).
Japanese Decision of Refusal w/translation for Application No. 2009-282234 dated May 17, 2011 (6 pages).

* cited by examiner

*Primary Examiner* — Nathan M Nutter
(74) *Attorney, Agent, or Firm* — Osha Liang LLP (57) ABSTRACT

A rubber composition has sufficient resistance to degradation and swelling caused by a liquid such as a water-soluble coolant and also is capable of having sufficient resistance to ozone. The rubber composition contains a fluororubber not having a vinylidene fluoride structure, a nitrile rubber, a fluorine-based oil and a peroxide vulcanizing agent.

6 Claims, 6 Drawing Sheets

RUBBER COMPOSITION AND USES THEREOF

TECHNICAL FIELD

The present invention relates to a rubber composition and use of the same, and specifically to a rubber composition that has sufficient resistance to degradation and swelling caused by a liquid such as a water-soluble coolant and is also capable of having sufficient resistance to ozone, and use of the same.

BACKGROUND ART

Many apparatuses, movable sections of which are often used in a circumstance (for example, a field of mechanical processing) exposed to water-soluble coolants such as water-soluble cutting oils, solvents or chemicals like limit switches used for position detection of a moving object or for detection of an operation limit or safety door switches for detecting whether or not a mechanical guard or cover is closed, are present.

In such an environment, it is necessary to select a constituent material of a sealing member according to usage environment since degradation and swelling of the sealing member may take place, and conventionally, an NBR (acrylonitrile-butadiene rubber) or a fluororubber, which has excellent oil resistance and chemical resistance, is used. For example, in Patent Literature 1, there is disclosed a technology in which a sealing property against chemicals is secured by providing an O-ring made of a fluororubber between a bearing and a housing and a sealing property against sea water is secured by providing an O-ring made of a nitrile rubber.

Further, since an environmental gas in the field of mechanical processing may contain ozone, the degradation of the sealing member due to ozone becomes a problem when the sealing member is used in a circumstance where much ozone exists. It is disclosed in Patent Literature 2 that a rubber composition including a highly saturated rubber having a specific iodine number, a functional group-containing lube oil and a functional group-containing thermosetting resin has ozone resistance.

CITATION LIST

Patent Literatures

Patent Literature 1
Japanese Unexamined Patent Publication, Tokukai, No. 2005-135780 A (Publication Date: May 26, 2005)
Patent Literature 2
Japanese Unexamined Patent Publication, Tokukaihei, No. 9-67473 A (Publication Date: Mar. 11, 1997)

SUMMARY OF INVENTION

Technical Problem

As described above, a constituent material to be used for the above sealing member is required to have sufficient resistance to both degradation and swelling caused by a coolant or the like and is also required to have resistance to ozone when used under the environment of existence of ozone.

On the other hand, in recent years, a water-soluble coolant is increasingly used as the coolant in place of water-insoluble coolant which is flammable and high in environmental burden at the time of disposal. Such a water-soluble coolant is blended with an amine compound to prevent decay to be alkaline and blended with a surfactant to mix water and a base oil.

When the water-soluble coolant is used, the water-soluble coolant has problems that if for example, an NBR is used as a rubber material for sealing members, swelling is severe, and if a common fluororubber is used, mechanical strength of the rubber is deteriorated due to a hydrolysis action by the water-soluble coolant. Thus, in any coolant, it is difficult to secure sufficient sealing performance over a long period of time, and particularly in sealing members to seal a movable section, it is further difficult to secure sufficient sealing performance.

Since the O-ring disclosed in Patent Literature 1 is an O-ring formed by using a common fluororubber and a common NBR, it is difficult to attain sufficient resistance to degradation and swelling caused by a water-soluble coolant. Further, it is said that the rubber composition disclosed in Patent Literature 2 has ozone resistance, but there is no description concerning the resistance to degradation and swelling caused by a water-soluble coolant. As described above, there have not been findings about composition of a rubber composition which satisfies the resistance to the degradation and the swelling caused by a water-soluble coolant and further can satisfy sufficient ozone resistance.

The present invention has been made in view of the problems described above, and it is an object of the present invention to provide a rubber composition that has sufficient resistance to degradation and swelling caused by a liquid such as a water-soluble coolant and is also capable of having sufficient resistance to ozone, and use of the same.

Solution to Problem

The present inventors have made intense investigations concerning a rubber composition having sufficient resistance to degradation and swelling of a sealing member caused by a water-soluble coolant and to degradation of a sealing member caused by an environmental gas containing ozone, and consequently found that a rubber composition containing a specified fluororubber, a nitrile rubber, a fluorine-based oil and a specified vulcanizing agent has the above-mentioned resistance, and these findings have now led to completion of the present invention.

In accordance with one aspect of the present invention, the rubber composition of the present invention is characterized by containing a fluororubber not having a vinylidene fluoride structure, a nitrile rubber, a fluorine-based oil and a peroxide vulcanizing agent.

In accordance with the above constitution, since the rubber composition of the present invention contains a fluororubber not containing a vinylidene fluoride structure as a repeating unit, it can suppress swelling caused by a water-soluble coolant and is not subject to influences of degradation resulting from a dehydrofluorination reaction due to amine contained in the water-soluble coolant or the like. Therefore, degradation resistance is excellent and the production of cracks in the rubber composition can be suppressed.

Further, since the rubber composition of the present invention contains a nitrile rubber, it is superior in oil resistance, chemical resistance and mechanical strength. Furthermore, a fluorine-based oil serves as a plasticizer for the fluororubber and the nitrile rubber, and because it is low in compatibility with the water-soluble coolant and tends to exist at the surface of the rubber composition because of its relatively low molecular weight, the penetration of the water-soluble coolant into the rubber composition can be suppressed and the degradation and the swelling of the rubber composition can be further suppressed.

Further, since the rubber composition of the present invention contains a peroxide vulcanizing agent as a vulcanizing agent, it is possible to sufficiently perform crosslinking between the fluororubber and the nitrile rubber, which cannot be mixed with each other by a common vulcanizing agent and it is possible to sufficiently take advantage of the degradation resistance and the swelling resistance of the fluororubber and the mechanical strength of the nitrile rubber. Therefore, it is possible to provide a rubber composition having sufficient resistance to degradation and swelling caused by a liquid such as a water-soluble coolant, an oil or a chemical, particularly the water-soluble coolant.

Advantageous Effects of Invention

The rubber composition of the present invention is constituted so as to contain a fluororubber not having a vinylidene fluoride structure, a nitrile rubber, a fluorine-based oil and a peroxide vulcanizing agent.

Thus, the rubber composition of the present invention exerts an effect of providing a rubber composition having sufficient resistance particularly to degradation and swelling caused by a water-soluble coolant.

DESCRIPTION OF EMBODIMENTS

Hereinafter, the present invention will be described in detail. In addition, in the present specification, the statement "A to B" which represents a range means to be A or more and B or less.

(1. Rubber Composition)

The rubber composition of the present invention contains a fluororubber not having a vinylidene fluoride structure, a nitrile rubber, a fluorine-based oil and a peroxide vulcanizing agent.

The fluororubber refers to a synthetic rubber containing fluorine and the fluororubber used in the present invention refers to a fluororubber not having a vinylidene fluoride structure. The vinylidene fluoride structure is a structure represented by the following formula A:

Examples of the fluororubber not having a vinylidene fluoride structure include a tetrafluoroethylene-propylene-based rubber and a tetrafluoroethylene-vinyl ether-based rubber, and it is preferred from the viewpoint of the ease of availability that the fluororubber is at least one kind selected from tetrafluoroethylene-propylene-based rubbers and tetrafluoroethylene-vinyl ether-based rubbers.

The fluororubber not containing a vinylidene fluoride structure not only can suppress the swelling of the rubber composition caused by a water-soluble coolant or the like, but also does not cause a dehydrofluorination reaction due to an amine-based additive contained in the water-soluble coolant, an engine oil or the like, has resistance to degradation caused by a liquid such as a water-soluble coolant, and can inhibit the reduction in strength of the rubber composition. The reason for this is that the vinylidene fluoride structure is vulnerable to the attack by amine or the like contained in the water-soluble coolant, the engine oil or the like and is a degradation point (described later).

The fluororubber not having a vinylidene fluoride structure, for example, at least one kind selected from tetrafluoroethylene-propylene-based rubbers and tetrafluoroethylene-vinyl ether-based rubbers, may be used singly, or may be used in combination. When these rubbers are used in combination, they may be used in any ratio. In a circumstance where a water-soluble coolant is used, a machine tool for which the rubber composition of the present invention can be used may be required to be used in a low-temperature circumstance of 0° C. or more and less than 5° C. A tetrafluoroethylene-propylene-based rubber is more preferably used because many of the tetrafluoroethylene-propylene-based rubbers are usable even in such a low-temperature circumstance and is advantageous in cost.

In the present specification, the tetrafluoroethylene-propylene-based rubber refers to a copolymer of tetrafluoroethylene and propylene and/or a propylene derivative. The polymerization degree of the copolymer is not particularly limited. The tetrafluoroethylene-propylene-based rubber is not particularly limited, and for example, it includes copolymers containing repeating units represented by the general formula 1:

wherein a and b represent integers of 1 or more and R represents an electron-donating substituent.

The electron-donating substituent denoted by R in the general formula 1 is not particularly limited, and examples thereof include $(CH_3)_3C-$, $(CH_3)_2CH-$, $CH_3CH_2-$, $CH_3-$, $-O-$, $-S-$, and $-N^-R'$. R contained in each of b repeating units existing in a molecule, which is shown in the general formula 1, may be the same in all of the b repeating units, or may be different from one another. Herein, the R' represents an alkyl group.

The tetrafluoroethylene-propylene-based fluororubber has fewer degradation points than a vinylidene fluoride-based fluororubber (FKM) which is a common fluororubber and a copolymer of vinylidene fluoride and hexafluoropropylene.

Figure 2:
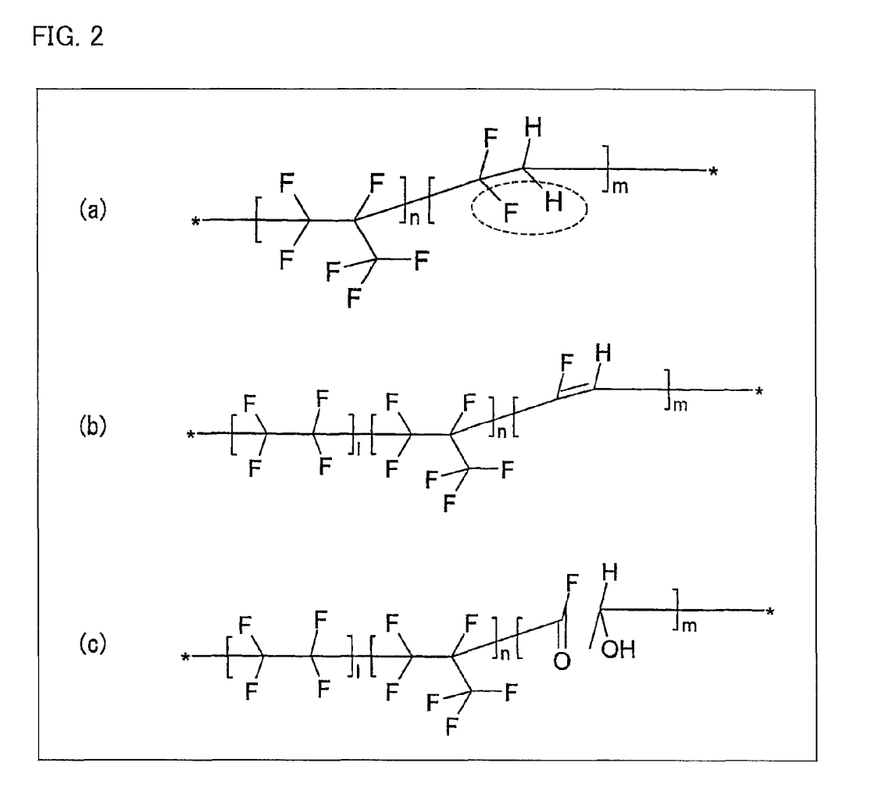
FIG. 2 is an illustrative view concerning a degradation mechanism of a vinylidene fluoride-based fluororubber (FKM).

That is, in the vinylidene fluoride-based fluororubber (FKM), as shown by a broken line in (a) of FIG. 2, HF (hydrogen fluoride) is detached from polyvinylidene fluoride to produce an unsaturated bond to be a degradation point as shown in (b) of FIG. 2, and if an addition reaction takes place between the unsaturated bond and amine etc. contained in a water-soluble coolant or an engine oil etc., cleavage occurs as shown in (c) of FIG. 2 to produce cracks in the fluororubber.

Figure 3:
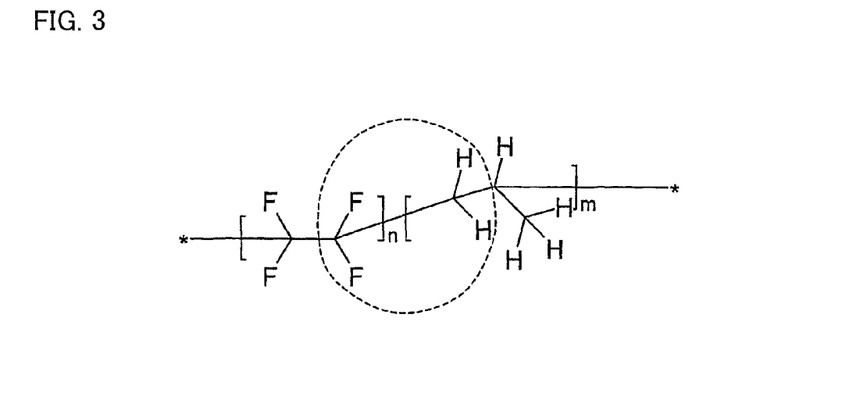
FIG. 3 is a view showing that there are few points where hydrogen fluoride is detachable in a tetrafluoroethylene-propylene-based fluororubber.

On the other hand, the tetrafluoroethylene-propylene-based fluororubber is more resistant to degradation than the vinylidene fluoride-based fluororubber (FKM) since as shown by a broken line in FIG. 3, a point where HF (hydrogen fluoride) is detachable is limited to every terminal of homopolymer and an electron attracting group does not exist in the vicinity of a fluorine group and therefore a detachment reaction hardly occurs. The same is true with other fluororubbers not having a vinylidene fluoride structure such as the tetrafluoroethylene-vinyl ether-based fluororubber.

If the fluororubber composition used in the present invention contains a vinylidene fluoride structure represented by the equation A as with FKM, this can cause degradation of the fluororubber composition as described above.

Thus, it is preferred that the rubber composition of the present invention does not contain the fluororubber containing a vinylidene fluoride structure at all. Even when the rubber composition contains the fluororubber containing a vinylidene fluoride structure, the proportion of the number of the vinylidene fluoride structures to the number of all repeating units of the fluororubber contained in the rubber composition is preferably 1% or less. When the proportion is 1% or less, influences of a water-soluble coolant on the degradation of the rubber composition is extremely small as a whole even though the rubber composition is exposed to the water-soluble coolant, and therefore the objects of the present invention can be attained.

In addition, the "number of repeating units" refers to, for example, a sum of the number of tetrafluoroethylenes, the number of propylenes and the number of propylene derivatives when the fluororubber is the tetrafluoroethylene-propylene-based rubber, and refers to a sum of the number of tetrafluoroethylenes, the number of vinyl ethers and the number of vinyl ether derivatives when the fluororubber is the tetrafluoroethylene-vinyl ether-based rubber.

Further, the "propylene derivative" refers to a compound formed by substituting another atom or a functional group for a hydrogen atom of propylene and/or a methyl group of a side chain of propylene. Examples of the propylene derivative include a compound formed by substituting another atom or a functional group for a methyl group of a side chain of propylene, a compound formed by substituting another functional group for a hydrogen atom in a methyl group of a side chain of propylene, and a compound formed by substituting a fluorine atom for a hydrogen atom in a main chain and/or a side chain of propylene.

In the rubber composition of the present invention, since the fluororubber not having a vinylidene fluoride structure is used, it is not necessary for blending an acid acceptor such as a metal oxide or a metal hydroxide, which has high affinity for water like a metal oxide, for example magnesium oxide or zinc oxide, and a metal hydroxide, for example calcium hydroxide, as an acid acceptor for HF (hydrogen fluoride) produced at the time of vulcanization, and swelling due to water is suppressed and particularly resistance to the water-soluble coolant such as a water-soluble cutting oil is improved.

Examples of the tetrafluoroethylene-propylene-based rubber used in the present invention, other than the copolymer containing repeating units represented by the general formula 1, include a copolymer of tetrafluoroethylene and perfluoropropylene. Although the copolymer has a characteristic that its use at low-temperatures of about 5° C. or lower is difficult, it can exhibit excellent resistance to the degradation due to the water-soluble coolant since it does not have a vinylidene fluoride structure.

In the present specification, the tetrafluoroethylene-vinyl ether-based rubber refers to a copolymer of tetrafluoroethylene and vinyl ether and/or a vinyl ether derivative. The "vinyl ether derivative" refers to a compound formed by substituting another atom such as a fluorine atom for a hydrogen atom in a vinyl group contained in vinyl ether. The tetrafluoroethylene-vinyl ether-based rubber is not particularly limited but it is preferably a copolymer of tetrafluoroethylene and perfluorovinyl ether. The vinyl ether and vinyl ether derivatives are not particularly limited and methyl vinyl ether, perfluoromethylvinyl ether and the like can be used.

The proportion of tetrafluoroethylene in molecules of the tetrafluoroethylene-propylene-based rubber and the tetrafluoroethylene-vinyl ether-based rubber is not particularly limited.

The nitrile rubber is a copolymer of acrylonitrile and 1,3-butadiene. In the rubber composition of the present invention, the nitrile rubber is used for the purpose of suppressing the deterioration of mechanical strength of the rubber composition, and a hydrogenated nitrile rubber described later is used, in addition to this purpose, for the purpose of imparting ozone resistance to the rubber composition.

A ratio between acrylonitrile and 1,3-butadiene in the nitrile rubber is not particularly limited, but the nitrile rubber is preferably a so-called extremely high nitrile rubber from the viewpoint of suppressing the swelling of the rubber composition in a circumstance exposed to the water-soluble coolant. That is, the content of acrylonitrile group in a molecule of a nitrile rubber is preferably 43 mol % or more and 60 mol % or less, and more preferably 43 mol % or more and 55 mol % or less.

In a circumstance exposed to ozone, a double bond in the nitrile rubber reacts with the ozone to form ozonide and the formed ozonide ultimately becomes a hydroxide to break the double bond. As a result of this, cracks can be produced in the rubber composition. Accordingly, in the rubber composition used in the circumstance, the nitrile rubber is preferably a hydrogenated nitrile rubber (HNBR). The hydrogenated nitrile rubber is formed by changing an unstable unsaturated bond in a polymer main chain of the nitrile rubber to a saturated bond through hydrogenation, and thereby chemical resistance, heat resistance and weather resistance of the nitrile rubber are improved.

When the hydrogenated nitrile rubber is blended in the fluororubber not having a vinylidene fluoride structure, the ozone resistance of the rubber composition can be enhanced and the deterioration of mechanical strength of the rubber composition can be decreased.

Hydrogenation of the nitrile rubber can be performed through conventionally publicly known hydrogenation. The proportion of double bonds in the hydrogenated nitrile rubber is preferably 10% or less when the number of all carbon-carbon bonds of the hydrogenated nitrile rubber is taken as 100%. However, the rubber composition of the present invention is not always used in a circumstance exposed to ozone. In this case, the nitrile rubber does not always have to be a hydrogenated nitrile rubber.

In the rubber composition of the present invention, it is preferred that when the total weight of the fluororubber and the nitrile rubber is taken as 100 parts by weight, the weight ratio of the fluororubber to the nitrile rubber is 10:90 to 90:10. The present inventors have found that although the nitrile rubber has excellent mechanical strength, the rubber composition tends to be swelled with the water-soluble coolant or the like when the content of the nitrile rubber is too high, and that although the fluororubber has resistance to degradation due to the water-soluble coolant or the like, as distinct from the nitrile rubber, the mechanical strength of the rubber composition tends to be low when the content of the fluororubber is too high and the rubber composition tends to be swelled with the water-soluble coolant or the like when the content of the fluororubber is too low. Then, the present inventors have made investigations on the weight ratio and found that it is preferred that when the total weight of the fluororubber and the nitrile rubber is taken as 100 parts by weight, the weight ratio of the fluororubber to the nitrile rubber is 10:90 to 90:10 for maintaining the strength of the rubber composition and for preventing the swelling.

Particularly when a sealing member containing the rubber composition of the present invention is applied for a limit switch, the above weight ratio of the fluororubber to the nitrile rubber is more preferably 30:70 to 70:30. The reason for this is that since a movable section is slidably arranged in contact with a sealing member because of functionality in the limit switch, the rubber composition needs to have mechanical strength and the ability to suppress swelling for preventing a liquid such as a water-soluble coolant from penetrating into the limit switch.

The fluorine-based oil serves as a plasticizer for the fluororubber and the nitrile rubber, and it can further suppress the degradation and swelling of the rubber composition due to the water-soluble coolant because it is low in compatibility with the water-soluble coolant and tends to exist at the surface of the rubber composition because of its relatively low molecular weight.

As the fluorine-based oil, for example, perfluoropolyether (PFPE), CTFE oil (lower polymer of chlorotrifluoroethylene), polytetrafluoroethylene (PTFE), and fluoroesters (e.g., DOS, $C_7$ fluoroalkyl camphorate, $C_7$ fluoroalkyl pyromellitate) can be used. A skeleton of the fluorine-based oil is preferably linear and a perfluorinated linear fluorine-based oil is the most preferred, because such fluorine-based oil allows the rubber composition to have a large effect of suppressing the swelling.

With respect to the content of the fluorine-based oil, since a too low content causes a low-temperature property to deteriorate and a too high content causes mechanical strength and workability of the rubber composition to deteriorate, the content of the fluorine-based oil is preferably 1 to 10 parts by weight with respect to 100 parts by weight of a rubber component including the fluororubber and the nitrile rubber.

The tetrafluoroethylene-propylene-based rubber and the tetrafluoroethylene-vinyl ether-based rubber do not cause a dehydrofluorination reaction as described above, but they are low in a vulcanizing property. By using the peroxide vulcanizing agent, the fluororubber and nitrile rubber used in the present invention can be simultaneously cross-linked. The peroxide vulcanizing agent is not particularly limited and examples thereof include alkyl, acyl, ketoneperoxide, diacylperoxide, hydroperoxide, dialkylperoxide, peroxyketal, alkylperester, and percarbonate vulcanizing agents.

The respective peroxide vulcanizing agents may be used singly, or may be used as a mixture thereof. The mixing ratio of the mixture may be optional.

As the alkyl peroxide vulcanizing agent, for example, 2,5-dimethyl-2,5-di(t-butylperoxy)hexane, 1,3-bis(t-butylperoxy)-diisopropylbenzene and the like can be suitably used. As the acyl peroxide vulcanizing agent, for example, dicumylperoxide, benzoylperoxide and the like can be suitably used.

The content of the peroxide vulcanizing agent is preferably a content required to satisfy the mechanical strength and swelling degree of the rubber composition targeted according to usage environment of the rubber composition of the present invention. Particularly when the rubber composition of the present invention is used for a limit switch, the content of the peroxide vulcanizing agent is preferably 0.1 to 20 parts by weight with respect to 100 parts by weight of a rubber component including the fluororubber and the nitrile rubber. The reason for this is that since a movable section is slidably arranged in contact with a sealing member because of functionality in the limit switch, the rubber composition needs to have mechanical strength and the ability to suppress swelling for preventing a liquid such as a water-soluble coolant from penetrating into the limit switch.

A vulcanization accelerator aid may be added to the rubber composition of the present invention as required. As the vulcanization accelerator aid, for example, multi-allyl compounds such as triallyl isocyanurate, triallyl cyanurate and the like, trimethylolpropane trimethacrylate, and sodium stearate can be suitably used.

As with the content of the peroxide vulcanizing agent, the content of the vulcanization accelerator aid is preferably a content required to satisfy the mechanical strength and swelling degree of the rubber composition targeted according to usage environment of the rubber composition of the present invention. Particularly when the rubber composition of the present invention is used for a limit switch, the content of the vulcanization accelerator aid is preferably 1 to 10 parts by weight with respect to 100 parts by weight of a rubber component including the fluororubber and the nitrile rubber. The reason for this is that since a movable section is slidably arranged in contact with a sealing member because of functionality in the limit switch, the rubber composition needs to have mechanical strength and the ability to suppress swelling for preventing a liquid such as a water-soluble coolant from penetrating into the limit switch.

It is preferred that a filler is added to the rubber composition of the present invention for reinforcement. As the filler, for example, carbon black, talc, wollastonite, and Mistron paper etc. are suitable. This filler is preferably added in an amount of 20 to 70 parts by weight with respect to 100 parts by weight of a rubber component including the fluororubber and the nitrile rubber. On the other hand, acidic materials such as silica and clay are not preferable since they delay the vulcanization.

Further, it is preferred that dioctyl adipate (DOA) is added to the rubber composition of the present invention as a plasticizer. Thereby, low-temperature resistance can be improved while maintaining the effect of suppressing the swelling of the rubber composition of the present invention and the mechanical strength of the rubber composition of the present invention. Particularly when a high nitrile rubber or an extremely high nitrile rubber, in which the content of acrylonitrile group is high, is used, since the high nitrile rubber or the extremely high nitrile rubber, in which the content of acrylonitrile group is higher than that of the nitrile rubber, is inferior in low-temperature resistance as compared to the nitrile rubber, addition of DOA is very effective. Further, the tetrafluoroethylene-vinyl ether-based rubber has trouble with use in a low-temperature circumstance of 0° C. or more and less than 5° C., but by the addition of DOA, the low-temperature resistance can be improved and the use in a low-temperature circumstance becomes possible.

The amount of the DOA to be added is preferably a blending amount required to satisfy, in the rubber composition of the present invention, a characteristic of low-temperature resistance as well as the mechanical strength and swelling degree targeted according to usage environment of the rubber composition of the present invention. Particularly when the rubber composition of the present invention is used for a limit switch, the amount of the DOA is preferably 0 to 10 parts by weight with respect to 100 parts by weight of a rubber component including the fluororubber and the nitrile rubber on the grounds that since a movable section is slidably arranged in contact with a sealing member because of functionality in the limit switch, the rubber composition needs to have mechanical strength and the ability to suppress swelling for preventing a liquid such as a water-soluble coolant from penetrating into the limit switch and needs to satisfy the characteristic of low-temperature resistance in a severe circumstance where the limit switch is used.

Furthermore, other publicly known additives for rubbers (for example, antioxidant, stabilizer, mold release agent, etc.) may be appropriately added to the rubber composition of the present invention as required.

The rubber composition of the present invention has been attained by making investigations concerning constituent components which are effective for suppressing degrading factors for the purpose of achieving the suppression of degradation of the rubber composition based on a hydrolysis reaction due to the water-soluble coolant, the suppression of swelling of the rubber composition due to the water-soluble coolant, and imparting of ozone resistance to the rubber composition, and by uniquely finding an optimal combination of the constituent components, more preferably the above combination and a blending balance. It is far from easy to find such a combination and a blending balance.

For example, the rubber composition of the present invention can be used as a sealing member in a movable section of an apparatus used in a severe circumstance of being exposed to a water-soluble coolant, but conventionally, there is no finding about the above combination and the blending balance which can impart sufficient mechanical strength and ability to suppress swelling to the rubber composition even in such a severe circumstance. Particularly, in a limit switch, since a movable section is slidably arranged in contact with a sealing member because of functionality, the rubber composition is required to have high mechanical strength and high resistance to swelling for preventing a liquid such as the water-soluble coolant from penetrating into the apparatus, but conventionally, there is no finding about the above combination of constituent components which can achieve high mechanical strength and high resistance to swelling simultaneously, more preferably the above combination and the blending balance. Heretofore, it has been very difficult to find the combination and the blending balance.

When the constituent components are blended for the purpose of imparting oil resistance, cold resistance or heat resistance to the rubber composition, the oil resistance, the cold resistance or the heat resistance varies linearly according to the blending ratios of the constituent components. On the other hand, it is almost impossible to predict the effect of significantly improving the resistance to degradation due to the water-soluble coolant and swelling resistance of the rubber composition by having a constitution, in which a fluororubber not having a vinylidene fluoride structure, a nitrile rubber, a fluorine-based oil and a peroxide vulcanizing agent are contained, even if considering combinations of the above-mentioned fluororubber, nitrile rubber, fluorine-based oil and peroxide vulcanizing agent.

Conventionally, the nitrile rubber is replaced with a vinylidene fluoride rubber in order to suppress the swelling of the nitrile rubber, but the present inventors have found that as described above, the rubber composition is degraded due to hydrolysis by amine contained in the water-soluble coolant when the vinylidene fluoride rubber is used.

Thus, the present inventors have made intense investigations concerning favorable constituent components of the rubber composition for the purpose of preventing degradation due to a water-soluble coolant to improve mechanical strength while inhibiting swelling, and the present inventors have found the fact that it is preferred to use a fluororubber not having a vinylidene fluoride structure in combination with a nitrile rubber. Furthermore, the present inventors have found that it is preferred to use a hydrogenated nitrile rubber for imparting ozone resistance, that by including a fluorine-based oil in the rubber composition, the permeation of the water-soluble coolant into the rubber composition can be further prevented, and that by using a peroxide vulcanizing agent, a crosslinking reaction of the fluororubber and the nitrile rubber can be promoted. Moreover, the present inventors have found the weight ratio of the fluororubber to the nitrile rubber, which is preferable for maintaining the strength of the rubber composition and for preventing swelling.

Accordingly, the rubber composition of the present invention has excellent resistance to the deterioration of mechanical strength and swelling due to a liquid such as a water-soluble coolant. Naturally, since the rubber composition also has oil resistance, it can be used not only for the resistance to a water-soluble coolant but also for the resistance to oil.

A method of producing the rubber composition of the present invention is not particularly limited and conventionally publicly known methods can be employed. For example, the rubber composition can be produced by a method in which a fluororubber, a nitrile rubber, a fluorine-based oil and a peroxide vulcanizing agent as well as other additives etc. are mixed in predetermined proportions, kneaded with a roll kneader or a sealed kneading machine, and then subjected to compression molding, or injection molding to perform vulcanization molding according to the cross-linking conditions generally used.

As a shape of a fluororubber molded article, any shape, for example, a ring-like shape, a sheet-like shape, a rod-like shape and shapes of various complicated blocks, may be adopted according to their applications.

In the present specification, the water-soluble coolant refers to a coolant which can be dissolved and emulsified in water, and generally, it is blended with an amine compound to be alkaline and blended with a surfactant in order to mix water and a base oil. Examples of the water-soluble coolant include a water-soluble cutting oil, an engine oil, a transmission oil, and a brake oil, and also include steam generated at a factory line.

In addition, the water-soluble cutting oil may be either an emulsion type (a cutting oil which includes a component insoluble in water, such as a mineral oil and a fatty oil, and a surfactant, and becomes creamy white if adding water to dilute the cutting oil), a soluble type (a component soluble in water, such as a surfactant, alone, or a cutting oil which includes a component soluble in water and a component insoluble in water, such as a mineral oil and a fatty oil, and becomes transparent or semi-transparent if adding water to dilute the cutting oil), or a solution type (a cutting oil which includes a component soluble in water, and becomes transparent if adding water to dilute the cutting oil).

(2. Sealing Member and Apparatus)

The sealing member of the present invention contains the rubber composition of the present invention, and the apparatus of the present invention includes the sealing member of the present invention. A shape of the sealing member is not particularly limited and it may be appropriately modified according to its application. Examples of the shape include a O-ring-like shape, a sheet-like shape, a packing, and a gasket. The sealing member may appropriately contain components other than the rubber composition of the present invention as required. As such components, the sealing member may appropriately contain, for example, a crosslinking agent, a crosslinking aid, a plasticizer, an antioxidant, a filler, a coloring agent, a foaming agent, and a processing aid.

The sealing member is not particularly limited, but it is preferably used particularly for a sliding section of an apparatus used in a circumstance of being exposed to a water-soluble coolant or ozone since the rubber composition of the present invention is superior in the mechanical strength and the swelling resistance. By using the above sealing member in the sliding section, the durability of the apparatus can be significantly improved.

Accordingly, the sealing member of the present invention is applicable to, for example, movable sections such as limit switches, safety door switches, robot arms or connectors, bending sections such as coating materials of a wire and a cable, and stretching sections such as an oil ring, a door packing of a machine tool and rubber boots.

According to the above description, the apparatus of the present invention may include apparatuses which can be used in a circumstance of being exposed to a water-soluble coolant or ozone. Examples thereof include whole machine tools such as a limit switch, a safety door switch, a robot arm, a connector and a bearing.

Figure 1:
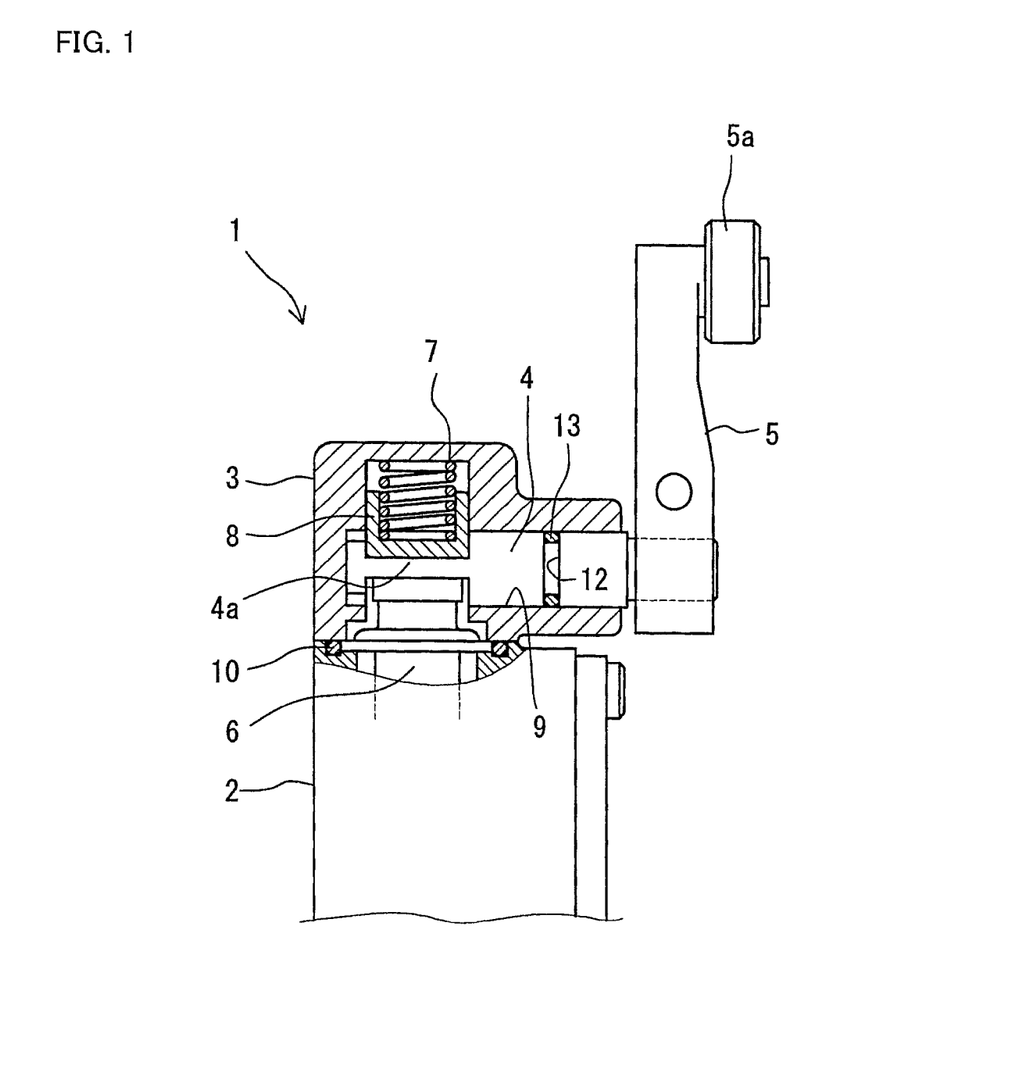
FIG. 1 is a diagram showing a structure of a limit switch which is an example of an apparatus of the present invention.

Next, in reference to FIG. 1, an example of the apparatus of the present invention will be described. FIG. 1 is a partially broken side view of a limit switch which is an example of an apparatus having a sealing member made of the rubber composition of the present invention.

The limit switch 1 includes a main body case 2 housing a switching mechanism not shown, a head 3 for operation connected to an upper portion of the case, a rotation axis 4 rotatably fitted into the head 3, and a detection lever 5 fixedly connected to an external end of the rotation axis 4. A flatted surface at a lower end of a pressing member 8 biased downward by a spring 7 is pressed to abut to a top face of a flattened portion 4a formed in a part of the rotation axis 4 by cutting to retain the rotation axis 4 at a neutral position, and an actuator (plunger) 6 back-biased upward receives and supports the rotation axis 4 at a bottom face of the flattened portion 4a.

When a target substance for detection from either a right or a left direction abuts to a roller 5a at the tip of the detection lever 5 to apply a rotational operation force toward either a right or a left direction to the rotation axis 4, the flattened portion 4a of the rotation axis 4 rotates while pressing up and displacing the pressing member 8 against a biasing force of the spring 7, and the bottom face of the flattened portion 4a presses down and operates the actuator 6 to turn on. Further, when the operation force applied to the detection lever 5 is released, the rotation axis 4 is rotated backward to the original neutral position by a pressing force applied from the pressing member 8 to the top face of the flattened portion 4a and in accordance with this configuration, the actuator 6 rises backward to return to a state of switch-off.

In the limit switch 1 thus constituted, for example, an O-ring 13 serving as a sealing member of the present invention is fitted into an annular groove 12 formed in the outer circumference of the rotation axis 4 in a sliding section between an axis insertion hole 9 formed in the head 3 and the rotation axis 4. Further, an O-ring 10 serving as a sealing member is also interposed and placed in a joint section between the head 3 for operation and the main body casing 2.

In the limit switch 1 in the present embodiment, since the O-rings 10, 13 serving as sealing members are made of the rubber composition of the present invention, degradation and swelling of the O-rings 10, 13 are sufficiently suppressed when being exposed to the water-soluble coolant. Consequently, the penetration of the water-soluble coolant into the sliding section can be sufficiently suppressed and the durability of the limit switch 1 can be improved. Further, when a hydrogenated nitrile rubber is used as a nitrile rubber, the degradation of the O-rings 10, 13 due to ozone can be sufficiently suppressed since the formation of ozonide is suppressed even when the limit switch 1 is used in a circumstance where much ozone exists.

In the rubber composition of the present invention, when a total weight of the fluororubber and the nitrile rubber is taken as 100 parts by weight, a weight ratio of the fluororubber to the nitrile rubber is preferably 10:90 to 90:10.

In accordance with the above constitution, the content of the fluororubber not containing a vinylidene fluoride structure and the content of the nitrile rubber are in a range which is favorable for achieving the mechanical strength and prevention of swelling of the rubber composition simultaneously. Therefore, swelling caused by a water-soluble coolant can be suppressed with more certainty and practically sufficient mechanical strength of the rubber composition can be secured while eliminating influences of degradation resulting from a dehydrofluorination reaction due to amine contained in the water-soluble coolant or the like.

In the rubber composition of the present invention, the fluororubber is at least one kind selected from tetrafluoroethylene-propylene-based rubbers and tetrafluoroethylene-vinyl ether-based rubbers.

In accordance with the above constitution, since the fluororubber is a typical fluororubber not having a vinylidene fluoride structure, a rubber composition having sufficient resistance to degradation and swelling caused by a water-soluble coolant can be provided at low cost.

In the rubber composition of the present invention, the tetrafluoroethylene-propylene-based rubber may be a copolymer containing repeating units represented by the general formula 1:

(1)

wherein a and b represent integers of 1 or more and R represents an electron-donating substituent.

In accordance with the above constitution, since the electron-donating substituent substitutes for a side chain of a propylene group constituting the rubber composition, the rubber composition does not undergo a dehydrofluorination reaction even when it is placed in special environmental conditions such as an excited state. Therefore, it is possible to provide a rubber composition having higher resistance to degradation caused by a liquid such as a water-soluble coolant.

In the rubber composition of the present invention, in the general formula 1, the electron-donating substituent is preferably a methyl group. The rubber composition is easy to synthesize and advantageous in cost since it is a copolymer of tetrafluoroethylene and propylene.

In the rubber composition of the present invention, the tetrafluoroethylene-vinyl ether-based rubber may be a copolymer of tetrafluoroethylene and perfluorovinyl ether. Since the copolymer does not also contain a vinylidene fluoride structure and does not cause a dehydrofluorination reaction due to amine contained in the water-soluble coolant or the like, it has excellent degradation resistance. Accordingly, it is possible to provide a rubber composition having sufficient resistance to degradation and swelling caused by a liquid such as a water-soluble coolant.

In the rubber composition of the present invention, the tetrafluoroethylene-propylene-based rubber may be a copolymer of tetrafluoroethylene and perfluoropropylene. Although the rubber composition has an electron attracting group in the side chain, it has excellent degradation resistance since it does not contain a vinylidene fluoride structure and does not cause a dehydrofluorination reaction due to amine contained in the water-soluble coolant or the like. Accordingly, it is possible to provide a rubber composition having sufficient resistance to degradation and swelling caused by a liquid such as a water-soluble coolant.

In the rubber composition of the present invention, in the nitrile rubber, the content of acrylonitrile group is preferably 43 mol % or more and 60 mol % or less. In accordance with the above constitution, since the nitrile rubber is a so-called extremely high nitrile rubber, a rubber composition having very excellent oil resistance can be provided.

In the rubber composition of the present invention, the nitrile rubber is preferably a hydrogenated nitrile rubber. Since the hydrogenated nitrile rubber has a small content of carbon-carbon double bonds, it hardly causes a reaction of the double bond with ozone. Therefore, the degradation of the rubber composition due to ozone can be significantly reduced and a rubber composition, which can exert sufficient ozone resistance even in a circumstance where ozone exists like a field of mechanical processing, can be provided.

In the rubber composition of the present invention, the fluorine-based oil is preferably a perfluorinated oil. The fluorine-based oil serves as a plasticizer for the fluororubber and the nitrile rubber, and because it is low in compatibility with the water-soluble coolant and tends to exist at the surface of the rubber composition because of its relatively low molecular weight, the penetration of the water-soluble coolant into the rubber composition can be suppressed. Therefore, in accordance with the above constitution, the degradation and swelling of the rubber composition can be further suppressed.

In accordance with another aspect of the present invention, a sealing member of the present invention is characterized by containing the rubber composition of the present invention. Further, an apparatus of the present invention is characterized by including the sealing member of the present invention.

Since the rubber composition of the present invention has sufficient resistance to degradation and swelling caused by a liquid such as a water-soluble coolant and also can have sufficient resistance to ozone as described above, the sealing member of the present invention can secure sufficient sealing performance over a long period of time. Therefore, by applying the sealing member to an apparatus such as a limit switch, a safety door switch, a cable or a connector, the penetration of the water-soluble coolant or the like into a sliding section etc. can be sufficiently suppressed even if these apparatuses are exposed to a circumstance where a coolant is used and further to a circumstance where much ozone exists. Therefore, the durability of the apparatus can be significantly improved and it becomes possible to operate the apparatus stably to prevent failures over a long period of time.

EXAMPLES

Hereinafter, the present invention will be described in more detail based on examples, but the present invention is not limited to the following examples.

Examples 1 to 3

Suppressing of Degradation and Swelling of a Rubber Composition

The results of measurements of the blend of constituent components of rubber compositions in examples and comparative examples and measurements of the swelling rate and the degradation rate of mechanical strength which are evaluation items are shown in Table 1.

TABLE 1

| Blend | Example 1 | Example 2 | Example 3 | Comparative Example 1 | Comparative Example 2 |
|---|---|---|---|---|---|
| FEPM | 30 | 30 | 85 | 100 | 0 |
| HNBR1 | 0 | 0 | 0 | 0 | 100 |
| HNBR2 | 70 | 70 | 15 | 0 | 0 |
| Carbon | 45 | 40 | 25 | 10 | 30 |
| 1,3,5-triallyl isocyanurate | 5 | 5 | 5 | 5 | 5 |
| Bis(tert-butyldioxy isopropyl)benzene | 1 | 1 | 1 | 2 | 2 |
| Dimethyldibutyl peroxyhexine | 0 | 0 | 0 | 0 | 0 |
| Sodium stearate | 1 | 1 | 1 | 1 | 1 |
| DOA | 14 | 7 | 1.5 | 0 | 0 |
| Perfluoropolyether | 6 | 3 | 3 | 0 | 0 |
| Swelling rate (%) | 5.4 | 5.5 | 7 | 9.4 | 18.16 |
| Degradation rate of mechanical strength (%) | 0.5 | 6.1 | −4.2 | 10.7 | −5.8 |

In Table 1, values in the blend of examples and comparative examples represent parts by weight. The respective constituent components were mixed in the blend shown in Table 1, and the resulting mixture was kneaded with a roll kneader or a sealed kneading machine etc. and then subjected to vulcanization molding through compression molding or injection molding according to the cross-linking conditions generally used. In this way, rubber compositions of Examples 1 to 3 and Comparative Examples 1 to 2 were produced.

FEPM refers to a copolymer of tetrafluoroethylene and propylene, and in the present examples, FEPM having a Mooney viscosity of about 100 was used. Both of HNBR1 and HNBR2 are hydrogenated nitrile rubbers and HNBR1 is a so-called medium-high nitrile type hydrogenated nitrile rubber and HNBR2 is a so-called extremely high nitrile type hydrogenated nitrile rubber. The content of acrylonitrile group in a molecule of the hydrogenated nitrile rubber is 36 mol % for the HNBR1 and 50 mol % for the HNBR2.

Carbon is a reinforcing agent, 1,3,5-triallyl isocyanurate is a co-crosslinking agent, bis(tert-butyldioxyisopropyl)benzene and dimethyldibutyl peroxyhexine are vulcanizing agents, sodium stearate is a vulcanization accelerator aid, DOA is a plasticizer, and perfluoropolyether is a fluorine-based oil.

Test pieces (JIS a dumbbell No. 3) of the rubber compositions in examples and comparative examples having the blend shown in Table 1 were dipped in Gryton 1700 (liquid temperature 100° C.), a water-soluble cutting oil, produced by TOHO Chemical Industry Co., Ltd. for 70 hours, and the swelling rate and the degradation rate of mechanical strength were calculated from the following equation.

Swelling rate(%)={(test piece weight after dipping−test piece weight before dipping)/test piece weight before dipping}×100

Further, with respect to the degradation rate of mechanical strength, tension at break (Tb) and elongation at break (Eb) of the test piece not dipped in Gryton 1700 were measured according to JIS K 6251 and tension at break (Tb') and elongation at break (Eb') of the test piece dipped in Gryton 1700 (liquid temperature 100° C.) for 70 hours were measured, and the degradation rate of mechanical strength was calculated according the following equation.

Degradation rate of mechanical strength(%)=[{(Tb'×Eb')−(Tb×Eb)}/(Tb×Eb)]×100

From the viewpoint of degradation resistance, the degradation rate of mechanical strength is preferably 10% or less, and from the viewpoint of swelling resistance, the swelling rate is preferably 10% or less.

As shown in Table 1, the rubber composition in Example 1 was formed by blending 30 parts by weight of FEPM and 70 parts by weight of a hydrogenated nitrile rubber (HNBR) of an extremely high nitrile type as 100 parts by weight of a rubber component and by further blending a fluorine-based oil as a plasticizer. In Example 1, good results were shown, that is, the swelling rate was 5.4% and the degradation rate of mechanical strength was 0.5% and particularly, the degradation rate of mechanical strength was small.

As with Example 1, the rubber composition in Example 2 was formed by blending 30 parts by weight of FEPM and 70 parts by weight of a HNBR of an extremely high nitrile type as 100 parts by weight of a rubber component and by further blending a fluorine-based oil as a plasticizer. Also in Example 2, good results were shown, that is, the swelling rate was 5.5% and the degradation rate of mechanical strength was 6.1%, but the degradation rate of mechanical strength was slightly larger than that of Example 1 probably because an amount of the blended fluorine-based oil was small.

The rubber composition in Example 3 was formed by blending 85 parts by weight of FEPM and 15 parts by weight of a HNBR of an extremely high nitrile type as 100 parts by weight of a rubber component and by further blending a fluorine-based oil as a plasticizer. In Example 3, good results were shown, that is, the swelling rate was 7% and the degradation rate of mechanical strength was −4.2%.

The rubber composition in Comparative Example 1 does not contain the nitrile rubber and the fluorine-based oil. The degradation rate of mechanical strength is conceivable to be more than 10% for this reason. The rubber composition in Comparative Example 2 does not contain the FEPM and the fluorine-based oil. The swelling rate is conceivable to be very large for this reason.

In the rubber compositions in Examples 1 to 3, since as described above, the FEPM not containing a vinylidene fluoride structure is blended as a rubber component and an acid acceptor such as a metal oxide or a metal hydroxide, which has high affinity for water, is not used, the results that the resistance to the water-soluble coolant is improved and the swelling can also be suppressed while suppressing the deterioration of mechanical strength were obtained.

Accordingly, an apparatus including a sealing member containing the rubber composition of the present invention can maintain good sealing performance over a long period of time even though being used in a circumstance exposed to a water-soluble cutting oil or the like.

Example 4

Durability Test by Use of a Limit Switch

The respective constituent components were mixed in the blend shown in Table 2, and the resulting mixture was kneaded with a roll kneader or a sealed kneading machine etc. and then subjected to vulcanization molding through compression molding or injection molding according to the cross-linking conditions generally used. In this way, the rubber composition of the present invention was produced. 5 lots of O-rings made of the rubber composition were prepared (shown as Samples 1 to 5 in Table 3) and were fit to limit switches 1 as O-rings 10, 13 shown in FIG. 1, respectively. As a control, 5 lots of O-rings made of only a nitrile rubber were used (shown as Samples A to E in Table 3).

TABLE 2

| Blend | Example 4 |
| --- | --- |
| FEPM | 30 |
| HNBR2 | 70 |
| Carbon | 15 |
| 1,3,5-triallyl isocyanurate | 5 |
| Bis(tert-butyldioxyisopropyl)benzene | 2 |
| Sodium stearate | 1 |
| DOA | 3.5 |
| Perfluoropolyether | 3 |
| Polymeric fatty acid metal salt plasticizer | 2 |

In order to identify a degree at which the water-soluble cutting oil penetrates into the switch and a degree at which functionally harmful failures such as cracks or fractures occur, the action of repeating on-off of the switch by pressing down and pressing up the actuator 6 in the water-soluble cutting oil was carried out 600000 times (frequency: 240 times/min) (hereinafter, this test is referred to as "test 1"). Next, in order to check the water resistance of the limit switch 1, a sample was immersed 1 meter under the water for 30 minutes and then an extent to which water penetrated into the switch was observed according to JIS C 4520 (paragraph 8.18) and JIS C 0920 (paragraph 4.8) (hereinafter, this test is referred to as "test 2").

Taking a set of test 1 and test 2 as one cycle, a degree of cracks of the rubber composition and a degree of penetrations of the water-soluble cutting oil or water into the limit switch were identified. In Table-3, the results of comparison between the number of cycles carried out before the water-soluble cutting oil or water penetrated into the limit switch subjected to test 1 and test 2 to cause a failure are shown. It should be noted that Gryton 1700 (liquid temperature 100° C.) used in Examples 1 to 3 was used as the water-soluble cutting oil.

TABLE 3

|  | Sample | Before test | 1 cycle | 2 cycles | 3 cycles | 4 cycles |
| --- | --- | --- | --- | --- | --- | --- |
| Using the rubber | 1 | Good | Good | Good | Good | Good |
|  | 2 | Good | Good | Good | Good | Good |

TABLE 3-continued

|  | Sample | Before test | 1 cycle | 2 cycles | 3 cycles | 4 cycles |
|---|---|---|---|---|---|---|
| composition of the present invention | 3 | Good | Good | Good | Good | Good |
|  | 4 | Good | Good | Good | Good | Good |
|  | 5 | Good | Good | Good | Good | Good |
| Control | A | Good | Poor*1 | — | — | — |
|  | B | Good | Good | Poor*2 | — | — |
|  | C | Good | Poor*1 | — | — | — |
|  | D | Good | Poor*1 | — | — | — |
|  | E | Good | Good | Poor*1 | — | — |

In Table 3, a symbol "Good" indicates that the penetration of the water-soluble cutting oil or water is not found, and a symbol Poor*1 indicates that a break is produced in the rubber composition and the water-soluble cutting oil or water penetrated to cause the failure of the limit switch 1. A symbol Poor*2 indicates that a break is produced in the rubber composition and the water-soluble cutting oil or water penetrated to cause the failure of the limit switch 1 and the break of a member referred to as a C-spring which is located in the main body case 2.

As the results of test 1 and test 2, in the limit switches fitted with the O-rings containing the rubber composition of the present invention, the penetration of the water-soluble cutting oil or water is not found even after 4 cycles and failures did not occur. On the other hand, an average of the number of cycles carried out before the limit switches fitted with the control O-rings made of the nitrile rubber suffer a breakdown was 1.4 cycles.

Figure 4:
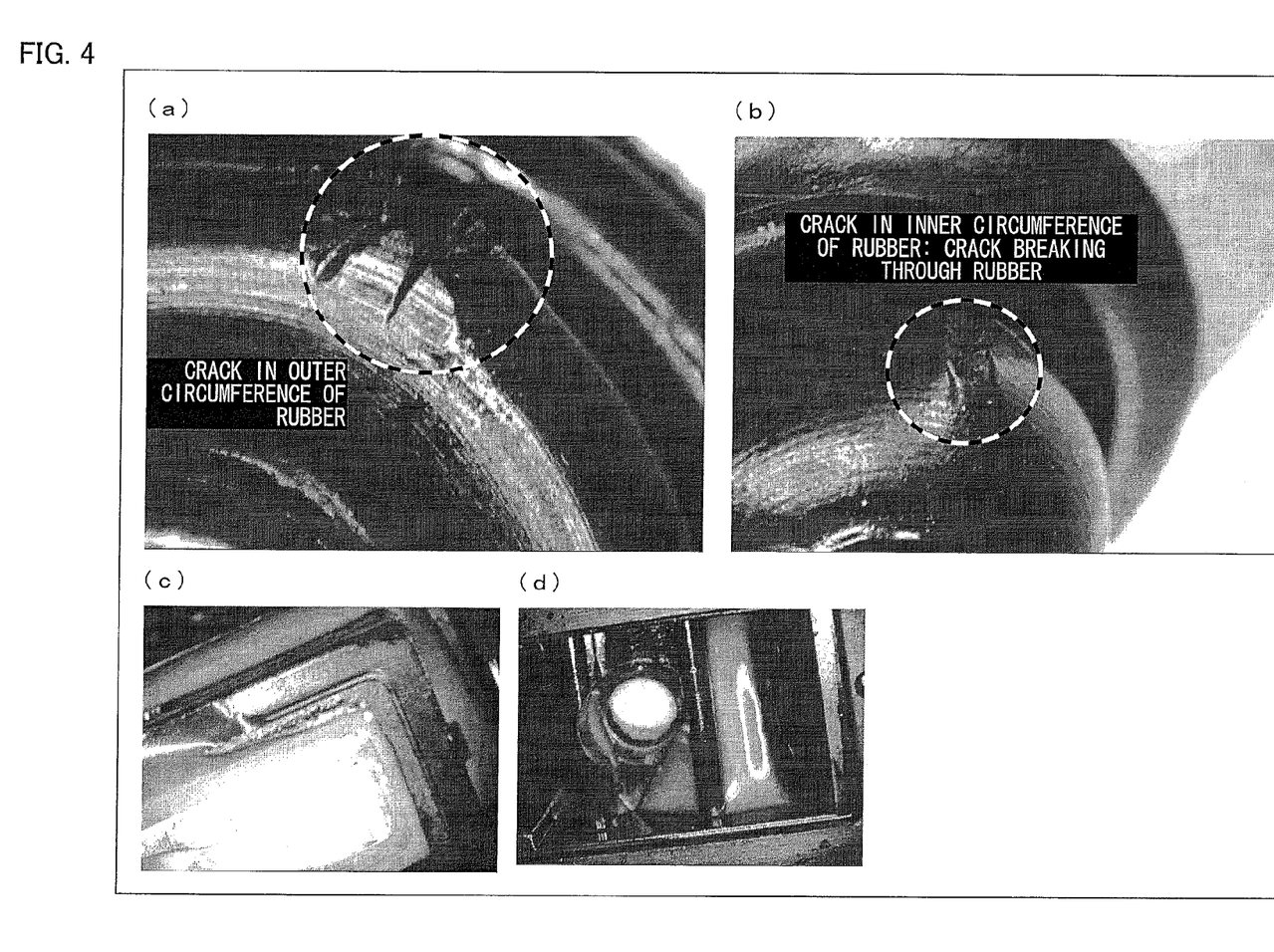
FIG. 4 is a view showing a state at the time when a limit switch using a control O-ring was subjected to a set of test 1 and test 2 by two cycles.

FIG. 4 is a view showing a state at the time when a limit switch using a control O-ring (Sample 3 in Table 3) was subjected by two cycles to the test 1 and the test 2, respectively. As shown in (a) of FIG. 4, a crack was produced in the outer circumference of the rubber, and as shown in (b) of FIG. 4, the crack went through to the inner circumference of the rubber. Further, as shown in (c) and (d) of FIG. 4, the insides of the limit switches were filled with the water-soluble coolant or water and measurement of insulation resistance and resistance to voltage of the limit switches showed that the limit switches were unusable. In addition, the insulation resistance was evaluated by measuring resistance at DV 500V and the resistance to voltage was evaluated by applying a voltage of 1200 V for 1 minute and confirming that there was not a leakage current of 10 mA or more.

Figure 5:
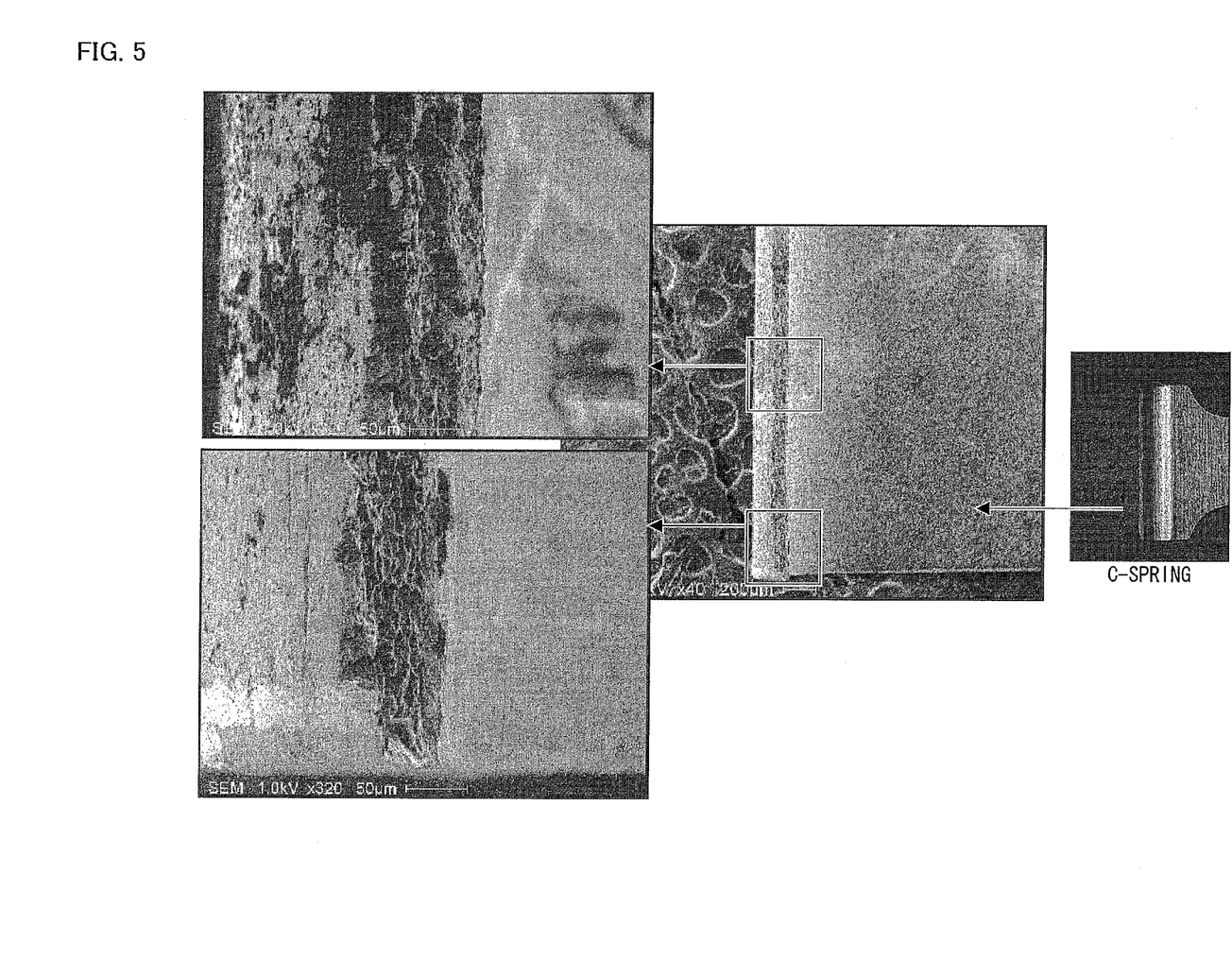
FIG. 5 is a view showing a member referred to as a C-spring, which is located in a main body case, observed after control Sample B shown in Table 3 was subjected to a set of test 1 and test 2 by two cycles.

FIG. 5 is a view showing a member referred to as a C-spring, which is located in the main body case 2, observed after control Sample B shown in Table 3 was subjected to a set of test 1 and test 2 by two cycles. In the C-spring shown in a photograph on right side in FIG. 5, a break proceeded along a grain boundary after the completion of two cycles as shown in electron micrographs at a center and on left side in FIG. 5, and a feature of stress corrosion crack was exhibited.

Figure 6:
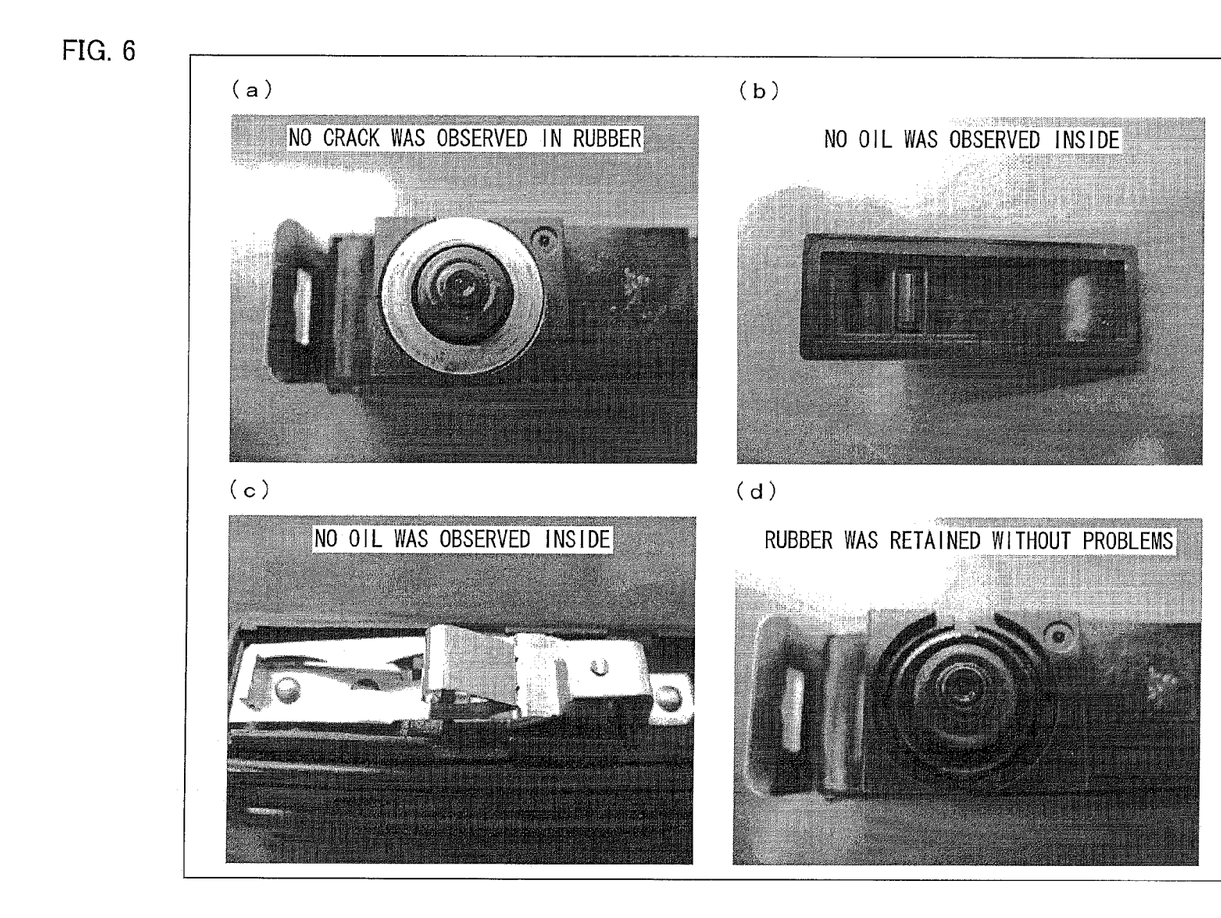
FIG. 6 shows appearances and internal states of Sample 1 using the rubber composition of the present invention shown in Table 3 after Sample 1 was subjected to a set of test 1 and test 2 by three cycles.

FIG. 6 shows appearances and internal states of Sample 1 using the rubber composition of the present invention shown in Table 3 after Sample 1 was subjected to a set of test 1 and test 2 by three cycles. As shown in (a) and (d) of FIG. 6, in the limit switch using the rubber composition of the present invention, a crack of the rubber was not produced and there was no abnormality in retention of the rubber. Further, as shown in (b) and (c) of FIG. 6, the water-soluble coolant and water did not penetrate into the limit switch at all. Moreover, the results of the measurements of insulation resistance and resistance to voltage of the limit switch showed that the limit switch has no problem.

Figure 7:
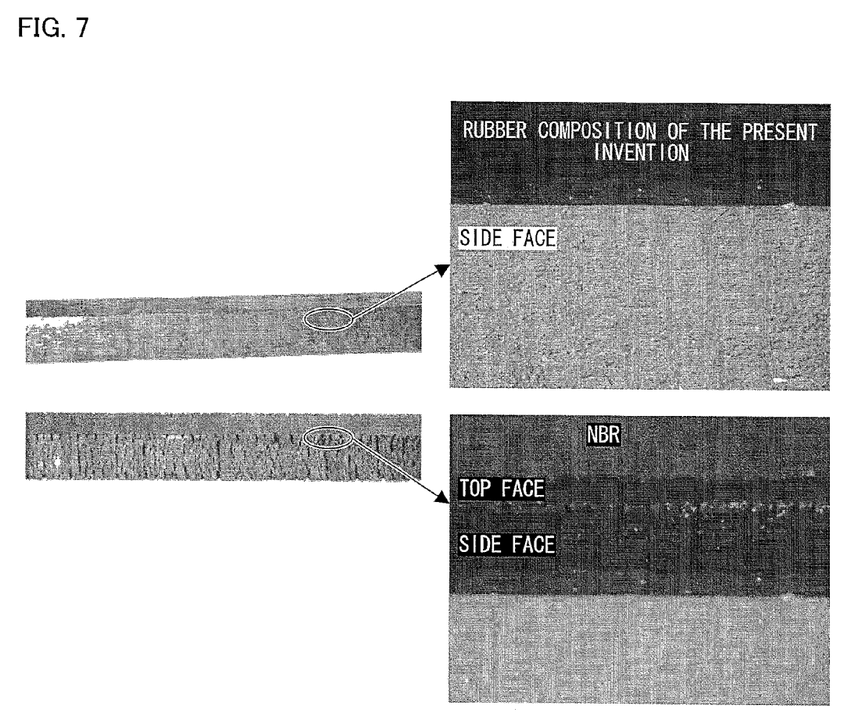
FIG. 7 shows appearances of the rubber composition of the present invention and a control nitrile rubber observed, and ozone resistance of the rubber composition of the present invention and the control nitrile rubber checked after the rubber composition of the present invention and the control nitrile rubber were left standing for 1 month around the facilities (ozone concentration: 0.05 ppm) of a mechanical processing line where a water-soluble cutting oil is used.

FIG. 7 shows appearances of the rubber composition of the present invention and the control nitrile rubber observed, and ozone resistance of the rubber composition of the present invention and the control nitrile rubber checked after the rubber composition of the present invention and the control nitrile rubber were left standing for 1 month around the facilities (ozone concentration: 0.05 ppm) of a mechanical processing line where a water-soluble cutting oil was used. As shown in FIG. 7, in the rubber composition of the present invention, there was no degradation due to ozone at all and no changes in the appearance. On the other hand, in the nitrile rubber, trace of crack was severe and degradation due to ozone was outstanding. In addition, the photographs of FIG. 7 were obtained by stretching the test piece (JIS a dumbbell No. 3) of the rubber composition of the present invention and the test piece (JIS a dumbbell No. 3) of the nitrile rubber by 50%, fixing these test pieces at their both ends with a jig, and observing their side faces.

The present invention is not limited to the embodiments described above, and various modifications may be made within the scope as set out in the accompanying claims, and embodiments achieved by appropriately combining technical means disclosed in different embodiments, respectively, are therefore embraced by the technical scope of the present invention.

INDUSTRIAL APPLICABILITY

The rubber composition of the present invention has sufficient resistance to degradation and swelling caused by a water-soluble coolant and can also have resistance to ozone. Therefore, the rubber composition of the present invention can be widely applied to machine tools and the like, which are used under the circumstances of being exposed to the water-soluble coolant or ozone.

REFERENCE SIGNS LIST

1 Limit switch
2 Main body case
4 Rotation axis
5 Detection lever
6 Actuator (plunger)
10, 13 O-ring

The invention claimed is:
1. A rubber composition, comprising:
tetrafluoroethylene-propylene-based rubber which is a copolymer containing repeating units represented by the general formula 1;
a hydrogenated nitrile rubber;
a perfluoropolyether; and
a peroxide vulcanizing agent

(1)

wherein a and b represent integers of 1 or more and R represents an electron-donating substituent.
2. The rubber composition according to claim 1, wherein when the total weight of the tetrafluoroethylene-propylene-based rubber and the hydrogenated nitrile rubber is taken as 100 parts by weight, a weight ratio of the tetrafluoroethylene-propylene-based rubber to the hydrogenated nitrile rubber is 10:90 to 90:10.

3. The rubber composition according to claim 1, wherein in the general formula 1, the electron-donating substituent is a methyl group.

4. The rubber composition according to claim 1, wherein in the nitrile rubber, the content of acrylonitrile group is 43 mol % or more and 60 mol % or less.

5. A sealing member comprising a rubber composition according claim 1.

6. An apparatus comprising a sealing member according to claim 5.

* * * * *